United States Patent [19]

Kohno

[11] Patent Number: 4,951,553
[45] Date of Patent: Aug. 28, 1990

[54] FRICTION CLUTCH FOR TRANSMISSION
[75] Inventor: Satoshi Kohno, Kanagawa, Japan
[73] Assignee: Atsugi Motor Parts Company, Limited, Kanagawa, Japan
[21] Appl. No.: 329,952
[22] Filed: Mar. 29, 1989
[51] Int. Cl.$^5$ .............................................. F16D 13/48
[52] U.S. Cl. ............................... 192/70.13; 192/70.29; 192/98; 192/99 A
[58] Field of Search ................... 192/70.13, 70.29, 70.3, 192/98, 99 A

[56] References Cited

U.S. PATENT DOCUMENTS

| 2,045,557 | 6/1936 | Almen et al. | 192/70.29 X |
| 2,171,908 | 9/1939 | Beringer | 192/70.29 X |
| 2,366,643 | 1/1945 | Nutt | 192/70.13 |
| 3,337,016 | 8/1967 | Maucher | 192/70.3 X |
| 3,392,812 | 7/1968 | Kaptur et al. | 192/70.29 X |
| 3,779,353 | 12/1973 | Maucher | 192/99 A X |
| 4,754,860 | 7/1988 | Fukutake et al. | 192/70.25 |

FOREIGN PATENT DOCUMENTS

| 2400261 | 7/1974 | Fed. Rep. of Germany | 192/70.3 |
| 3508868 | 9/1986 | Fed. Rep. of Germany | 192/99 A |

*Primary Examiner*—Rodney H. Bonck
*Attorney, Agent, or Firm*—Bachman & LaPointe

[57] ABSTRACT

A friction clutch for a transmission is provided. The clutch includes release levers disposed between a release bearing and a diaphragm spring. The diaphragm spring provides pressure to a pressure plate which is required to hold a clutch disc against a flywheel. The outer end of each release lever is pivotably supported by a clutch cover and the inner end thereof engages with the release bearing. The pulling of the release bearing in the axial direction away from the flywheel causes the release lever to swing about the supported position thereof against the pressure exerted by the diaphragm spring, thereby causing the clutch to be released, or disengaged. The release lever is comprised of a lever body and a movable lever for engaging the release bearing. The insertion of the release bearing into the clutch allows secure engagement between it and the release lever. The release bearing is therefore removed from the clutch easily. In addition, the further thrusting of the release bearing into the clutch causes the movable lever to move, which movement in turn causes a locked lever position allowing engagement between the movable lever and the release bearing to be released. The engagement of the release bearing to the clutch is effected easily.

15 Claims, 7 Drawing Sheets

FRICTION CLUTCH FOR TRANSMISSION

BACKGROUND OF THE INVENTION

The present invention relates generally to a clutch for a transmission. More particularly, the invention relates to a friction clutch for a transmission wherein the pulling of a release bearing allows the disengagement of the clutch.

A conventional friction clutch includes a diaphragm spring which has a release lever, integrally formed on the inner end thereof, for engaging with a release bearing assembly directly, the outer end of this spring is supported by a clutch cover. The diaphragm spring provides pressure directly to a pressure plate which is required to hold a friction disc against a flywheel. The pulling of the release bearing tends to cause the diaphragm spring to become deformed, thereby weakening the pressure exerted to the pressure plate. This pressure is necessary to release, or disengage the clutch.

Moreover, in another type of conventional clutch, a release bearing assembly includes an inner sleeve member and an outer sleeve member. One of these sleeves (usually the inner sleeve) engages with the inner periphery of the diaphragm spring of a clutch cover assembly installed on a flywheel. The diaphragm spring and the inner sleeve are fastened in this engaged position.

However, in the above clutches, the rigidity of the diaphragm spring is dependent upon the spring properties thereof and therefore the rigidity of the lever integrally provided on the end of the diaphragm spring is also determined by same. For these reasons, a rigidity of lever sufficient to disengage the clutch is not obtained. It will be appreciated that the pulling of the lever by the release bearing assembly causes it to be deformed greatly and therefore the clutch does not disengage sufficiently.

Further, the fastening positions of the diaphragm spring to the inner sleeve are invisible. The positioning between the two during assembly and disassembly thereof is relatively difficult. The direct connecting of the diaphragm to the release bearing assembly tends to increase the thrust load on the inner sleeve or the outer sleeve, thereby inducing abnormal wear of the release bearing.

SUMMARY OF THE INVENTION

It is accordingly an object of the present invention to provide a friction clutch for providing secure disengagement.

It is another object of the invention to provide a friction clutch promoting easy assembly and disassembly thereof.

According to one aspect of the present invention, there is provided a clutch for a transmission which comprises a clutch cover installed on a flywheel, a pressure plate, supported by the clutch cover so as to be allowed to move in the axial direction of the clutch, a clutch disc disposed between the pressure plate and the flywheel and connecting to the shaft of a transmission, a diaphragm spring for providing pressure to the pressure plate which is required to hold the clutch disc against the flywheel, a release bearing for supporting the shaft of the transmission and movable in the axial direction of the clutch, and a release lever, provided independent of the diaphragm spring, for thrusting the diaphragm spring to release the pressure provided by the diaphragm spring so as to cause the clutch to disengage from the flywheel.

In a preferred embodiment, the outer end of the release lever is pivotably supported by the clutch cover and the inner end thereof engages with the release bearing. The release lever is adapted for rotating according to the movement of the release bearing in a direction away from the flywheel so as to thrust the inner perimeter of the diaphragm spring in the same direction.

According to another aspect of the invention, there is provided a clutch for a transmission which comprises a clutch cover installed on a flywheel, a pressure plate, supported by the clutch cover so as to be allowed to move in the axial direction of the clutch, a clutch disc disposed between the pressure plate and the flywheel and connected to the shaft of a transmission, a diaphragm spring for providing pressure to the pressure plate which is required to hold the clutch disc against the flywheel, a release bearing pre-assembly for supporting the shaft of the transmission and movable in the axial direction of the clutch, and a release lever pre-assembly for establishing engagement with the release bearing pre-assembly at a position defined by the relative movement between the release lever pre-assembly and the release bearing pre-assembly in the axial direction of the clutch, the release lever pre-assembly thrusting the diaphragm spring to release the pressure provided by the diaphragm spring so as to cause the clutch to disengage from the flywheel.

In a preferred embodiment, the release lever pre-assembly comprises a release lever and a movable lever for engaging with the release bearing. The movable lever is movable with respect to the release lever so as to engage with the release bearing pre-assembly at a first position defined by the relative movement between the release lever pre-assembly and the release bearing pre-assembly in the axial direction of the clutch and holds the engagement with the release bearing pre-assembly with regard to the movement of the release bearing pre-assembly in a direction away from the flywheel so as to disengage the clutch from the flywheel. The movable lever is further movable with respect to the release lever so as to allow the release bearing pre-assembly to disengage from the clutch at a second position defined by the relative movement between the release lever pre-assembly and the release bearing pre-assembly closer than the first position toward the flywheel.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

DESCRIPTION OF THE PREFERRED EMBODIMENT

Figure 1:
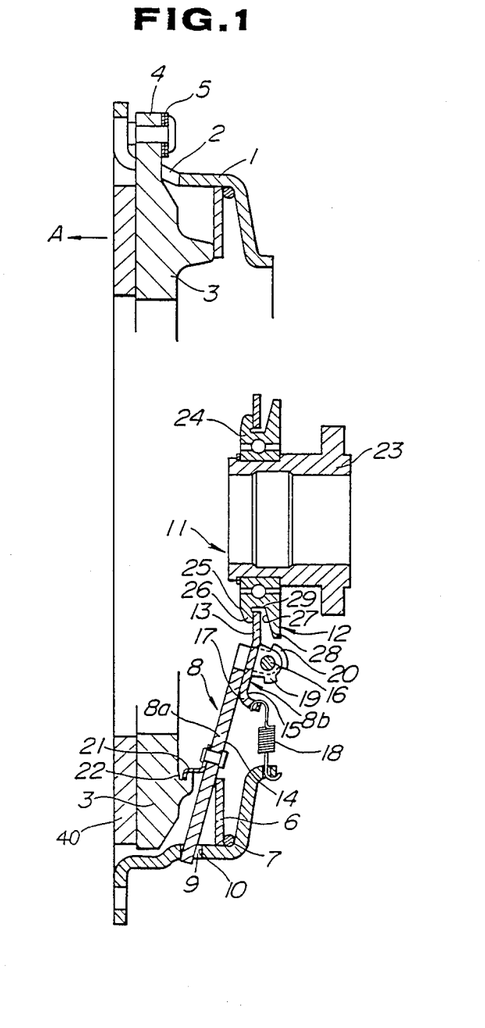
FIG. 1 is a longitudinal sectional view which shows a friction clutch of a first embodiment according to the present invention.
Figure 2:
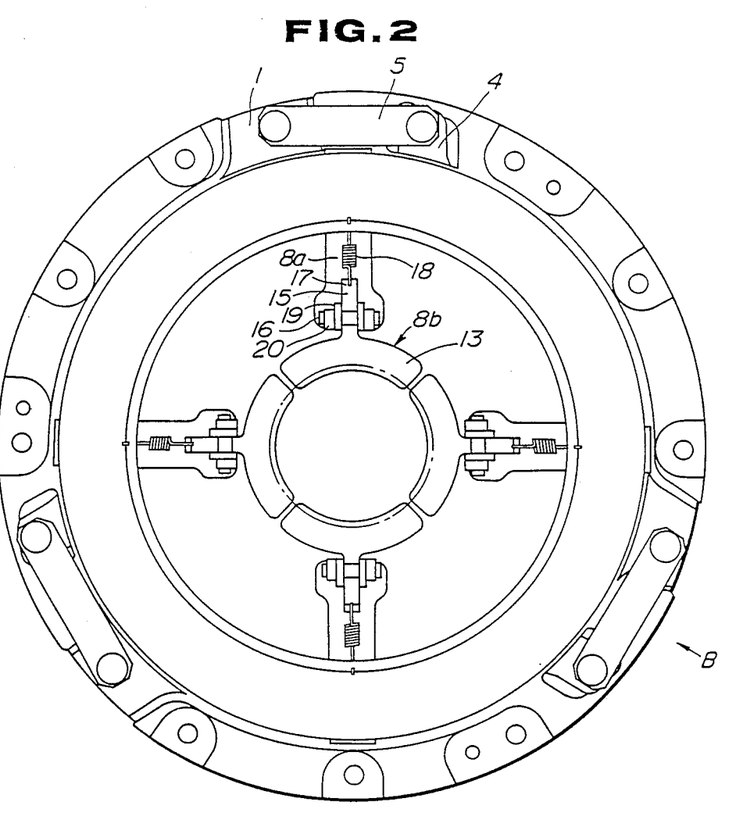
FIG. 2 is a front view which shows a friction clutch of a first embodiment excluding a release bearing assembly.
Figure 3:
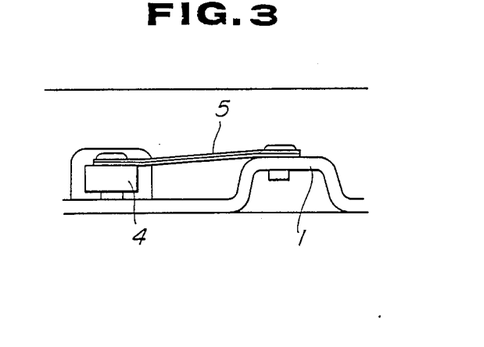
FIG. 3 is a segmentary view viewable from an arrow "B" in FIG. 2.

Referring now to the drawings, wherein like numbers refer to like parts in the several views, particularly to FIGS. 1 and 2, there is shown a friction clutch for a transmission according to the present invention. This clutch includes a clutch cover 1 installed on a flywheel (not shown), a pressure plate 3, a friction disc 40 connecting the shaft of a transmission (not shown), a diaphragm spring 6, release levers for the diaphragm spring 8, and a release bearing assembly 11 supported by a clutch housing (not shown). The pressure plate 3 has extending portions 4 each of which projects outwardly from an opening 2 provided in the clutch cover. Each end of the extending portions 4 is connected by a strap plate 5 to the clutch cover so as to be allowed to elastically move in the axis direction of the clutch (see FIG. 3). The diaphragm spring 6 is in the form of a ring shaped disc and is supported by the clutch cover 1 via a thrust ring 7 along its outer perimeter and provides required pressure to the pressure plate to hold the friction disc 40 against the flywheel (i.e., the diaphragm spring forces the pressure plate 3 in the direction indicated by an arrow "A" in FIG. 1). The four release levers 8, as shown in FIG. 2, are evenly spaced and have sufficient rigidity against the spring force of the diaphragm spring 6. Each of the release levers includes a lever body 8a and a rotatable lever 8b. The outer end portion of the release lever 8 is inserted into an opening 9 formed in the clutch cover and is supported by the inner wall thereof, while the inner end thereof engages with the release bearing assembly 11. The rotatable lever 8b has a flat section 13 in the radial direction of the clutch on its inner end. This flat section 13 is pivotably supported by the lever body 8a by means of a pin 16 through its middle portion thereof and the inner end section thereof is partly inserted into a groove formed in a flange portion 12 of the release bearing assembly 11. On the outer end section of the rotatable lever, a supporting portion 15 for contacting with a surface 14 of the lever body 8a of the release lever 8 is provided so as to support the weight of the release lever 8. The supporting portion includes a hook section 17 over which a hook of a tension spring 18 is hung. This spring is connected between the rotatable lever 8b and the clutch cover 1 to provide a righting movement to the rotatable lever. It will be noted that even if the rotatable lever 8b rotates about the pin 16 in a counterclockwise direction, it is restored in place due to the tensioning force exerted by the tension spring 18 (the supporting section 15 comes in contact with the surface 14 of the lever body of the release lever 8).

Figure 8:
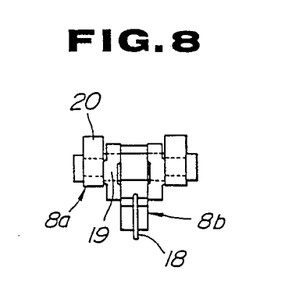
FIG. 8 is a segmentary view viewable from an arrow "C" in FIG. 7.

The rotatable lever 8b further includes a pair of protrusions functioning as a locking mechanism for locking it to the lever body 8a. When the rotatable lever rotates by a predetermined angle, its protrusions are tightly inserted between the fan-shaped protrusions which are formed on the lever body spaced at a distance slightly shorter than the width across the protrusions 19 of the rotatable lever so that the rotatable lever becomes fixed to the lever body (see FIG. 8).

If this tight fastening is released, the tension spring 18 urges the rotatable lever 8b to return to its original position.

Provided on the middle of the movable lever 8a is a hook member 21. This member is fixed to a surface thereof by a rivet and engages with a cut-out portion 22 of the pressure plate 3.

The release bearing assembly 11 is comprised of a release bearing 24 and a sleeve 23. The sleeve receives the shaft of the transmission (not shown) and is supported by a clutch housing (not shown) so as to be allowed to shift by a predetermined distance in the axial direction of the clutch. The release bearing 24 is fitted on the outer surface of the sleeve and includes, as described above, the flange portion 12 in which the groove for engaging with the rotatable lever 8b is formed. The flange portion has an outer diameter which is greater than the diameter defined by the inner edges of the flat section 13 of the release lever 8 and includes an engaging flange 26 having a tapered surface 25, a disengaging flange 28 having a tapered surface 27, and a groove 29 defined between the engaging and disengaging flanges. Outside diameter of the disengaging flange is greater than that of the engaging flange.

Figure 4:
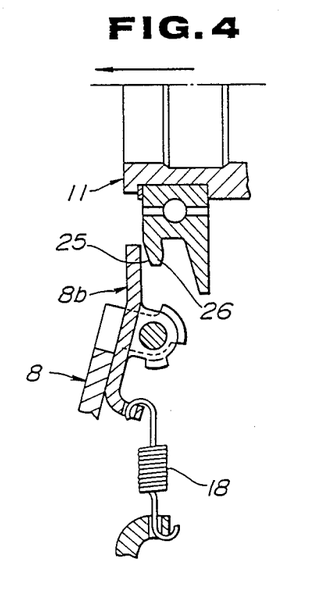
FIGS. 4 to 7 are partially sectional views of a clutch which show operations of engagement and disengagement between a release bearing assembly and a release lever.
Figure 5:
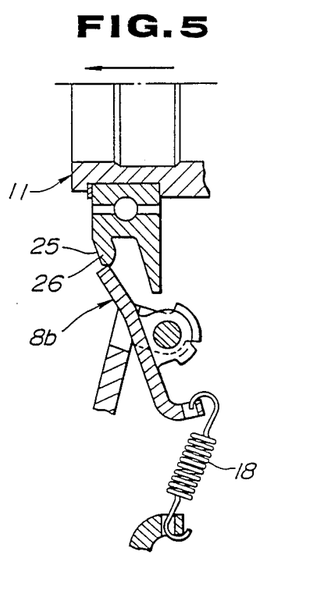
Figure 6:
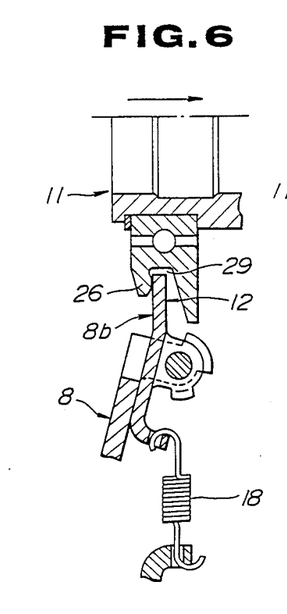

Referring to FIG. 4 to 8, the operation of engagement and disengagement between the release bearing assembly 11 and the release lever 8 is shown. With the above described arrangement, the shifting of the release bearing assembly 11 in the direction indicated by the arrow in FIG. 4 causes the contact between the tapered surface 25 of the engaging flange 26 and the inner edge of the rotatable lever 8b of the release lever 8. The further shifting of the release bearing assembly in the direction shown in FIG. 5 causes the rotation of the rotatable lever 8b against the spring force of the tension spring 18. The movable lever gets over the engaging flange along the tapered surface 25 and engages with the groove 29 of the release bearing assembly 11 as shown in FIG. 6. At this time, the rotatable lever 8b is returned to its position before the release bearing contacted with the movable lever 8b (as shown in FIG. 4) and thereby allows the secure engagement of the release lever 8 with the release bearing assembly 11.

For disengagement of the clutch after the engagement thereof, axial displacement of the release bearing assembly 11 in the right direction in FIG. 1 causes the release lever 8 to be pulled in by the engaging flange 26, rotating it slightly in a clockwise direction to the contact point between the outer end portion thereof and the outer wall of the opening 10. The rotation causes the inner edge of the diaphragm spring 6 to be thrust in the right direction. This action causes the pressure plate to be moved away from the friction disc 40 due to the spring force of the strap plate 5. As the pressure plate moves to the right, clearances appear between the pressure plate and the friction disc and between the friction disc and the flywheel. These clearances allow the flywheel to rotate independently of the friction disc. Thus, the clutch is disengaged.

Figure 7:
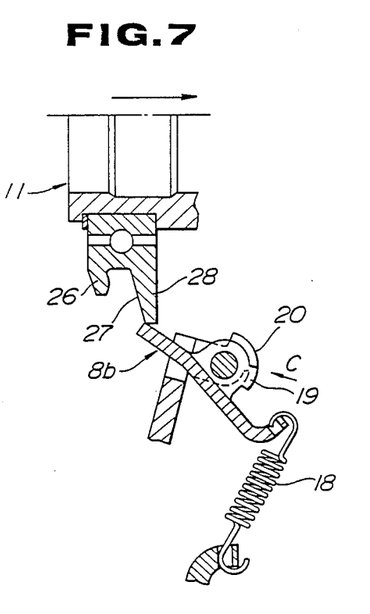

On the other hand, the disengagement between the release lever 8 and the release bearing assembly 11 requires a further displacement of the release bearing assembly in the left direction from the normal engaging position (see FIG. 6) where the release lever 8 engages with the release bearing assembly 11. This displacement causes the rotatable lever 8b to rotate in a counterclockwise direction at a predetermined angle, as shown in FIG. 7, along the tapered surface 27 of the disengaging flange 28 against the spring force of the tension spring 18 (the movable lever rotates until it is to the right of the disengaging flange 28). At this time, the pair of protrusions 19 of the rotatable lever 8b is inserted between the matched protrusions 20 on the lever body 8a of the release lever 8 and is locked thereby to the lever body. Therefore, in this status, movement of the release bearing assembly in the right direction allows the easy disengagement between the release lever 8 (movable lever 8b) and the release bearing assembly 11.

Due to the spring force exerted by the tension spring 18, the release of the locked protrusions 19 of the rotatable lever 8b by the protrusions 20 of the lever body 8a allows the return of the rotatable lever to its initial position.

Figure 9:
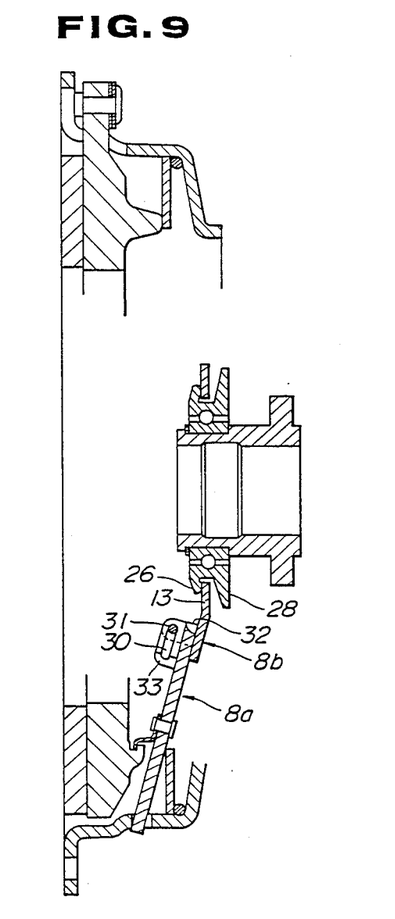
FIG. 9 is a longitudinal sectional view which shows a friction clutch of a second embodiment according to the present invention.
Figure 10:
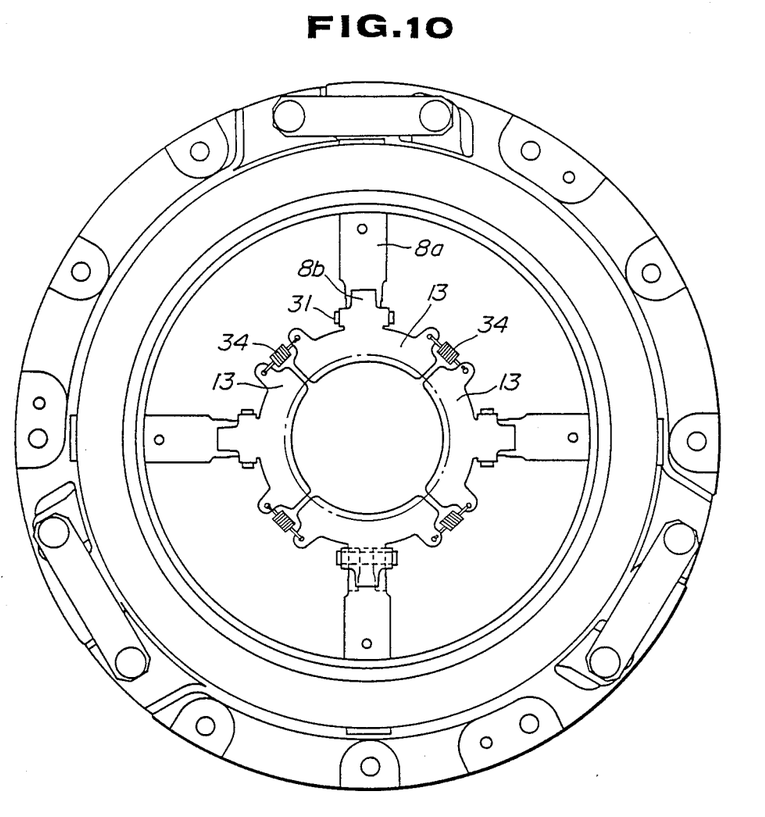
FIG. 10 is a front view which shows a friction clutch of a second embodiment excluding a release bearing assembly.

Referring to FIGS. 9 and 10, there is illustrated a friction clutch of a second embodiment according to the present invention. The description of parts and their operations similar to the above embodiment will be omitted.

Figure 15:
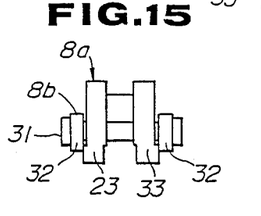
FIG. 15 is a segmentary view viewable from an arrow "D" in FIG. 14.

The nature of the second embodiment is the support of a movable lever 8b slidable with respect to a lever body 8a. The lever body 8a includes an elongated opening 30 in its inner end section into which a slide pin 31 provided on the movable lever 8b is inserted. It will be appreciated that the movable lever may move within a range defined by the opening 30. The range is provided so as to allow the movable lever 8b to get over an engaging flange 26 and a disengaging flange 28. The movable lever 8b has a pair of projecting sections 32 apart from each other at a predetermined distance. The lever body 8a has a pair of projecting sections 23 and 33 for engaging tightly with the projecting sections of the movable lever 32 (see FIG. 15). The locking of the movable lever 8b to the lever body 8a is established by this tight engagement. Each perpendicular section 13 of the rotatable levers 8b, as shown in FIG. 10, is elastically connected to adjacent one by a tension spring 34. This spring serves to return the movable lever to a given position thereof (which is the inner end position of the opening 30) after sliding the length of the elongated opening 30.

Figure 11:
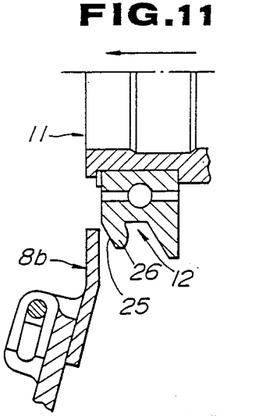
FIGS. 11 to 14 are partially sectional views of a clutch according to a second embodiment which show operations of engagement and disengagement between a release bearing assembly and a release lever.
Figure 12:
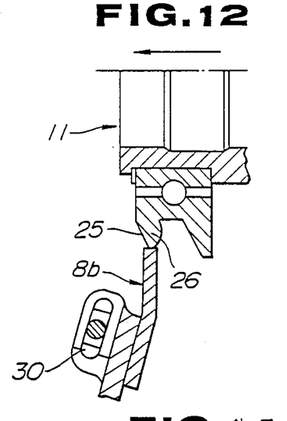
Figure 13:
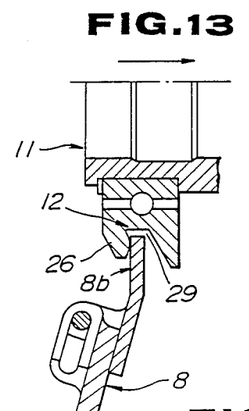
Figure 14:
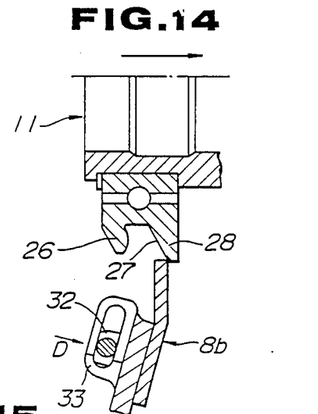

FIGS. 11 to 14 show the engagement and disengagement between the movable lever 8b and a release bearing assembly 11. In FIG. 11, the thrusting of the release bearing assembly in the direction indicated by the arrow (left) causes contact between the inner end portion of the movable lever and a tapered surface 25 of an engaging flange 26 of the release bearing assembly. The further thrusting of the release bearing assembly in the left direction causes, as shown in FIG. 12, the movable lever to slide within the opening 30 against the spring force exerted by the tension spring 34, getting over the engaging flange 26 along the tapered surface 25. The engagement of the rotatable lever 8b with the groove 29 is, as shown in FIG. 13, effected and the movable lever is returned to the original position thereof (to the same position as before the release bearing assembly came in contact with the movable lever as shown in FIG. 11) due to the tensioning force exerted by the tension spring 34. It will be appreciated that a secure engagement of the release lever 8 with the flange portion 12 of the release bearing assembly 11 may be obtained.

For disengagement of the release lever 8 with release bearing assembly 11, the further movement the release bearing assembly 11 in the left direction from the normal engaging position, as shown in FIG. 13, causes the movable lever 8b to slide a predetermined distance along the tapered surface 27 of the disengaging flange 28 against the spring force of the tension spring 34. The projecting portions 32 of the movable lever 8b are forcibly engaged by the projecting portions 23 and 33 of the lever body 8a of the release lever 8, thereby locking the movable lever to the lever body. It will be noted that the withdrawal of the release bearing assembly 11 in the right direction from this locking state allows the disengagement of the release lever 8 from the release bearing assembly 11 easily.

Due to the tensioning force exerted by the tension spring 34, the locked state of projecting sections 32 and the projecting sections 23 and 33 is terminated and causes the movable lever 8b to be returned to the original position thereof.

As described above, a friction clutch, according to the invention, includes a release lever the outer end of which is supported by the cover of the clutch and the inner end of which engages with a release bearing assembly. The release lever is provided so as to be operable to release the pressure between a diaphragm spring and a pressure plate when the release bearing assembly is withdrawn in the direction away from the flywheel. Therefore, great rigidity of the release lever may be provided regardless of the spring properties. This results in only the smallest deformation due to distortion of the release lever and the secure displacement of the pressure plate in the axial direction of the clutch to greatly improve the engagement/disengagement characteristics of the clutch.

The release lever has a movable portion which includes a returning means for returning the movable portion to its given position and a locking means for locking it at a predetermined position. Only pushing the release bearing assembly into the clutch therefore causes the movable portion to engage with the release bearing assembly securely. Pushing the release bearing assembly from this state of engagement further into the clutch causes the movable lever to be locked by the locking means, allowing the release bearing assembly to be easily disengaged from the clutch. This result is greatly improved operation of engaging the release bearing assembly to and disengaging it from the clutch.

Moreover, the provision of the release lever between the release bearing assembly and the diaphragm spring prevents the spring force of the diaphragm spring from influencing directly the release bearing assembly. It will be noted that the abnormal wear of the release bearing can be avoided hereby to obtain improved durability thereof.

Although the invention has been shown and described with respect to best modes of embodiment thereof, it should be understood by those skilled in the art that foregoing and various other changes, omissions, and additions in the form and detail thereof may be made therein without departing from the spirit and scope of the invention.

What is claimed is:

1. A clutch for a transmission comprising:

a clutch cover installed on a flywheel;
a pressure plate, supported by said clutch cover so as to be allowed to move in the axial direction of the clutch;
a clutch disc disposed between said pressure plate and the flywheel and connecting to the shaft of a transmission;
a diaphragm spring for providing pressure to said pressure plate which is required to hold said clutch disc against the flywheel;
a release bearing movable in the axial direction of the clutch;
a release lever, provided independent of said diaphragm spring, for thrusting said diaphragm spring to release the pressure provided by said diaphragm spring so as to cause the clutch to disengage from the flywheel; and
wherein said release lever includes a movable lever which is movable with respect to said release lever so as to allow engagement between said release lever and said release bearing at a first position defined by relative movement between said release lever and said release bearing in the axial direction of the clutch, said movable lever moving along with said release lever so as to release the pressure provided by said diaphragm spring so as to cause the clutch to disengage from the flywheel according to movement of said release bearing in a direction away form the flywheel, said movable lever being movable so as to allow said release bearing to disengage from said release lever at a second position closer than said first position toward said clutch disc defined by relative movement between said release lever and said release bearing in the axial direction of the clutch.

2. A clutch as set forth in claim 1, wherein the outer end of said release lever is pivotably supported by said clutch cover and the inner end thereof engages with said release bearing.

3. A clutch as set forth in claim 1, wherein the inner perimeter of said diaphragm spring comes in contact with said pressure plate and the outer perimeter thereof is supported by said clutch cover.

4. A clutch as set forth in claim 3, wherein the outer end of said release lever is pivotably supported by said clutch cover and the inner end thereof engages with said release bearing, said release lever rotating according to the movement of said release bearing in the axial direction so as to thrust the inner perimeter of said diaphragm spring in a direction where said clutch disc disengages from the flywheel.

5. A clutch for a transmission comprising:
a clutch cover installed on a flywheel;
a pressure plate, supported by said clutch cover so as to be allowed to move in the axial direction of the clutch;
a clutch disc disposed between said pressure plate and the flywheel and connected to the shaft of a transmission;
a diaphragm spring for providing pressure to said pressure plate which is required to hold said clutch disc against the flywheel;
a release bearing pre-assembly movable in the axial direction of the clutch;
a release lever pre-assembly for establishing engagement with said release bearing pre-assembly at a position defined by the relative movement between said release lever pre-assembly and said release bearing pre-assembly in the axial direction of the clutch, said release lever pre-assembly thrusting said diaphragm spring to release the pressure provided by said diaphragm spring so as to cause the clutch to disengage from the flywheel; and
wherein said release lever pre-assembly is provided with a release lever and a movable lever, said movable lever being movable with respect to said release lever so as to establish engagement with said release bearing pre-assembly at an engaging position defined by the relative movement between said release lever pre-assembly and said release bearing pre-assembly in the axial direction of the clutch and holding the engagement with said release bearing pre-assembly with regard to movement of said release bearing pre-assembly in a direction away from the flywheel so as to disengage the clutch from the flywheel, said movable lever being movable with respect to said release lever so as to allow said release bearing pre-assembly to disengage from said release lever pre-assembly with regard to the relative movement between said release lever pre-assembly and said release bearing pre-assembly to a disengaging position closer than said engaging position toward said clutch disc in the axial direction of the clutch.

6. A clutch as set forth in claim 5, wherein said release lever pre-assembly is a plurality of release levers arranged around said release bearing spaced equally from each other, each of said release levers including a movable lever movable with respect to said release lever so as to engage with said release bearing pre-assembly, said movable lever being movable with respect to said release lever so as to establish engagement with said release bearing pre-assembly at said engaging position defined by the relative movement between said release lever pre-assembly and said release bearing pre-assembly in the axial direction of the clutch and holding the engagement with said release bearing pre-assembly with regard to the movement of said release bearing in a direction away from the flywheel so as to disengage the clutch from the flywheel, said movable lever being movable with respect to said release lever so as to allow said release bearing pre-assembly to disengage from said release lever pre-assembly with regard to the relative movement between said release lever pre-assembly and said release bearing pre-assembly to a disengaging position closer than said engaging position toward said clutch disc in the axial direction of the clutch.

7. A clutch as set forth in claim 6, further comprising a plurality of tension springs connecting adjacent said movable levers so as to return said movable levers to an initial position after movement.

8. A clutch as set forth in claim 5, wherein said movable lever is rotatably supported by said release lever so as to engage with and disengage from said release bearing pre-assembly according to the movement of said release bearing pre-assembly in the axial direction of the clutch.

9. A clutch as set forth in claim 8, wherein said movable lever has an initial position and further comprising retaining means for retaining said movable lever so as to be returned to the initial position thereof after rotating.

10. A clutch as set forth in claim 9, wherein said retaining means is a tension spring.

11. A clutch as set forth in claim 5, wherein said movable lever is slidably supported by said release lever so as to engage with and disengage from said release bearing pre-assembly according to the relative movement between said release lever pre-assembly and said release bearing pre-assembly in the axial direction of the clutch.

12. A clutch as set forth in claim 11, wherein said movable lever has an initial position and further comprising retaining means for retaining said movable lever so as to be returned to the initial position thereof after sliding.

13. A clutch as set forth in claim 12, wherein said retaining means is a tension spring.

14. A clutch as set forth in claim 5, wherein said release bearing pre-assembly includes a first flange and a second flange spaced from said first flange by a predetermined distance, said movable lever being inserted into a groove defined by said first and said second flanges to establish engagement between said release lever pre-assembly and said release bearing pre-assembly.

15. A clutch as set forth in claim 5, further comprising locking means for locking said movable lever to said release lever so as to allow the withdrawal of said release bearing easily from the clutch at said disengaging position.

* * * * *